United States Patent [19]

Watanabe et al.

[11] Patent Number: 4,624,011
[45] Date of Patent: Nov. 18, 1986

[54] SPEECH RECOGNITION SYSTEM

[75] Inventors: Sadakazu Watanabe, Kawasaki; Hidenori Shinoda; Tsuneo Nitta, both of Yokohama; Yoichi Takebayashi, Tokyo; Shouichi Hirai, Yokohama; Tomio Sakata, Tokyo; Kensuke Uehara, Tokyo; Yasuo Takahashi, Tokyo, all of Japan; Haruo Asada, Cambridge, Mass.

[73] Assignee: Tokyo Shibaura Denki Kabushiki Kaisha, Kawasaki, Japan

[21] Appl. No.: 462,042

[22] Filed: Jan. 28, 1983

[30] Foreign Application Priority Data

Jan. 29, 1982 [JP] Japan .................................. 57-12792

[51] Int. Cl.[4] .............................................. G10L 5/00
[52] U.S. Cl. ...................................................... 381/43
[58] Field of Search ...................................... 381/41-50

[56] References Cited

U.S. PATENT DOCUMENTS

| 3,760,356 | 9/1973 | Srivastava | 340/146.3 |
| 3,906,446 | 9/1975 | Iijima et al. | 340/146.3 |
| 3,946,157 | 3/1976 | Dreyfus | 381/43 |
| 4,156,868 | 5/1979 | Levinson | 381/43 |
| 4,400,788 | 8/1983 | Myers et al. | 381/43 |
| 4,435,617 | 3/1984 | Griggs | 381/43 |

FOREIGN PATENT DOCUMENTS 2456210  8/1976  Fed. Rep. of Germany .
2085628  4/1982  United Kingdom .

OTHER PUBLICATIONS

The Bell System Technical Journal, vol. 59, No. 4, Apr. 1980, pp. 571-592.
IEEE Transactions on Pattern Analysis and Machine Intelligence, vol. PAMI-2, No. 2, Mar. 1980, pp. 136-148.
ICASSP 80 Proceedings of the IEEE International Conference on Acoustics, Speech and Signal Processing vol. 1 (Apr. 9-11) pp. 19-22.

*Primary Examiner*—E. S. Matt Kemeny
*Attorney, Agent, or Firm*—Oblon, Fisher, Spivak, McClelland & Maier

[57] ABSTRACT

An acoustic signal processing circuit extracts input speech pattern data and subsidiary feature data from an input speech signal. The input speech pattern data comprise frequency spectra, whereas the subsidiary feature data comprise phoneme and acoustic features. These data are then stored in a data buffer memory. The similarity measures between the input speech pattern data stored in the data buffer memory and reference speech pattern data stored in a dictionary memory are computed by a similarity computation circuit. When the largest similarity measure exceeds a first threshold value and when the difference between the largest similarity measure and the second largest measure exceeds a second threshold value, category data of the reference pattern which gives the largest similarity measure is produced by a control circuit to correspond to an input speech. When recognition cannot be performed, the categories of the reference speech patterns which respectively give the largest to mth similarity measures are respectively compared with the subsidiary feature data. In this manner, subsidiary feature recognition of the input voice is performed by a subsidiary feature recognition section.

8 Claims, 12 Drawing Figures

FIG. 9
| LABEL | G1 G2 G3 G4 |
|---|---|
| Q (SILENT) | E(n) < Eth |
| U (UNVOICED) |  |
| F (FRICATIVE) |  |
| W (FRICATIVE) |  |
| B (BUZZ) | 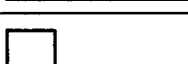 |
| G (PLOSIVE) | 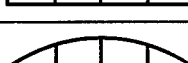 |
| N (NASAL) |  |
| S (SONORANT) | 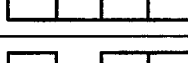 |
| H (SONORANT) | 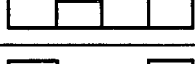 |
| M (SONORANT) | 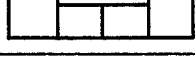 |
| D (ENERGY DIP) | |
| V (VOICED) | $\overline{(UVFVW)}$ |

SPEECH RECOGNITION SYSTEM

BACKGROUND OF THE INVENTION

The present invention relates to a speech recognition system for recognizing a word which has a plurality of syllables or polysyllable, as well as a single syllable word or monosyllable, with high precision, using a combination of pattern matching method and structure analysis method.

Pattern matching has been conventionally and frequently used for speech recognition. A time series of a spectrum envelope of an input speech is extracted as a feature parameter, and the obtained spectrum envelope is formed as an input speech pattern. The obtained speech pattern is compared with a reference speech pattern which is prestored in a dictionary memory, so as to compute a degree of matching thereof, that is, the similarity therebetween. Data of a category which includes the reference speech pattern having a maximum similarity to the measured speech pattern is outputted as a recognized result of the input speech. When the absolute value of the maximum value of the obtained similarity exceeds a predetermined threshold value, the input speech is regarded as recognized. However, when the absolute value is less than the predetermined threshold value, the input speech is regarded as unrecognized. When more than one similarity measure is obtained which exceeds the predetermined threshold value and the differences of which are small, a category corresponding to the largest value among the values of the similarity measures is determined to correspond to the input speech, thus often resulting in erroneous recognition. In other words, it is very difficult to perform speech recognition with high precision when monosyllables and polysyllables of similar speech patterns are involved.

SUMMARY OF THE INVENTION

It is an object of the present invention to provide a speech recognition system which enables distinct speech recognition of different speeches having similar speech patterns, and which performs proper speech recognition without an influence of noise.

According to a speech recognition system of the present invention, the similarity between an input speech pattern and a reference speech pattern which is prestored in a dictionary memory is computed for pattern matching, the largest and second largest values of the similarity measures are extracted, and it is checked whether or not the largest value exceeds the first threshold value and whether or not a difference between the largest value and the second largest value exceeds the second threshold value. When the largest value exceeds the first threshold value, and the difference between the largest value and the second largest value exceeds the second threshold value, a category which includes the reference speech pattern giving the largest similarity value is regarded, in a major recognition means, as the recognized input speech. When the largest similarity is less than the first threshold value, the input speech is rejected from recognition. In the case when the difference between the largest value and the second largest value does not exceed the second threshold value, and they exceed the first threshold value, the input speech is regarded as unrecognizable one in the major recognition means, and the categories which include reference speech patterns which give the largest value to the mth (where m is a positive integer) largest values of similarity measures are compared with the input speech pattern using a further speech feature parameter other than the feature parameter used in the similarity computation. The category of the input speech is then recognized by subsidiary recognition in accordance with the comparison result.

BRIEF DESCRIPTION OF THE DRAWINGS

FIGS. 8A, 8B and 8C are views showing codes of various data stored in a data buffer memory shown in FIG. 5;

FIG. 9 is a table for explaining the relationship between the 4-channel gross spectrum envelope and the acoustic feature label.

DETAILED DESCRIPTION OF THE PREFERRED EMBODIMENT

Figure 1:
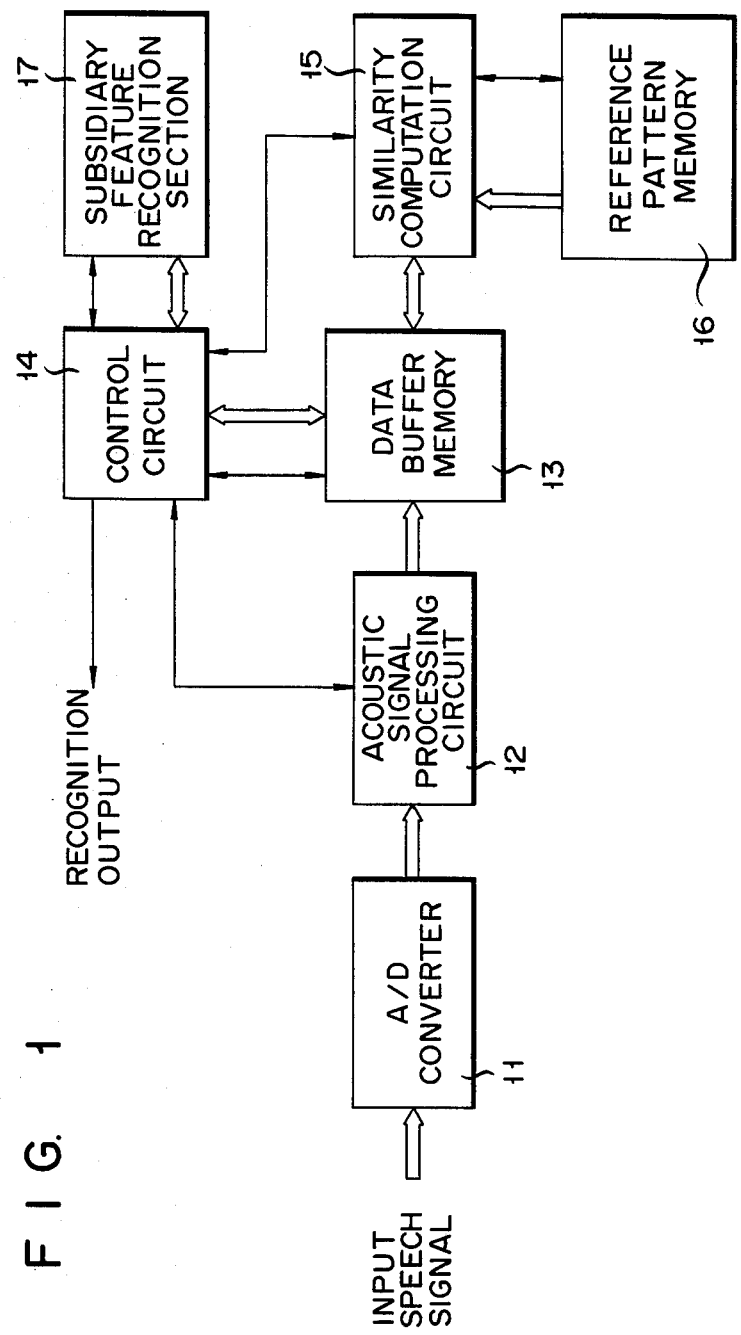
FIG. 1 is a block diagram of a speech recognition system according to an embodiment of the present invention.

A speech recognition system according to an embodiment of the present invention will be described with reference to the accompanying drawings. Referring to FIG. 1, an analog input speech signal entered through a microphone or the like is supplied to an A/D converter 11. This analog signal is then converted into a digital signal by the A/D converter 11 in accordance with its amplitude level. The digitized speech signal is then supplied to an acoustic signal processing circuit 12. The acoustic signal processing circuit 12 extracts necessary data (for speech recognition) such as a time series of a frequency spectrum of the input speech signal, and a gross channel spectrum obtained by roughly combining the frequency spectrum is computed. Further, phoneme similarity is computed from the frequency spectrum. The phoneme similarity constitutes a part of a subsidiary feature data. The frequency spectrum data is used as a first feature parameter for similarity computation, whereas the subsidiary feature data is used as a second feature parameter for subsidiary recognition. The frequency spectrum data and subsidiary feature data are stored in a data buffer memory 13 under the control of a control circuit 14.

Then, under the control of the control circuit 14, a similarity computation circuit 15 performs a similarity computation using the frequency spectrum data. The similarity computation circuit 15 computes a degree of similarity between the input speech pattern and the reference speech pattern the data of which is prestored in a reference pattern memory 16. The similarity measures obtained by the above computation are arranged from the largest value to the smallest. Data of the similarity measures is then supplied to the control circuit 14. The control circuit 14 determines whether or not the largest value exceeds a predetermined first threshold value, and at the same time whether or not a difference between the largest similarity measure and the second largest similarity measure exceeds another threshold value. If the control circuit 14 determines that these two conditions are both satisfied, the control circuit 14 then determines that the category of the reference speech pattern which gives the largest similarity measure corresponds to the input speech.

When the computed similarity measures satisfy the former condition and do not satisfy the latter condition described above, the control circuit 14 performs a procedure to extract a time-series of an acoustic feature of a speech from the gross spectrum and then a procedure to obtain a time series of a subsidiary feature from the phoneme similarity measures already obtained combining with it. Next, the control circuit 14 performs another recognition procedure using a subsidiary feature recognition section 17. Categories are extracted together with reference speech patterns which give the largest to the mth largest similarity measures. Similarity measures exceeding 80%, for example, are extracted in this case. The time series data of the phonemic and acoustic feature is checked with respect to the m categories to determine whether the phonemic and acoustic features to be accompanied with the respective words of the categories appear in a predetermined order, thereby determining which category being satisfied. If all the categories are not satisfied, the procedure of recognition should be rejected.

Subsidiary recognition based on the phonemic and acoustic feature data has the following meanings. If a plurality of candidate categories are present for which the differences of the similarity measures computed using the frequency spectrum speech pattern respectively are less than a given threshold value, any one of the candidate categories may correspond to the input speech pattern. The candidate categories can be readily found to be different from each other by checking the corresponding phonemic and acoustic feature data. Even if a candidate category is present which should correspond to an input speech pattern to be recognized, the computed similarity measures may be decreased due to various variation factors such as transmission channel distortion, speaker difference and so on. Therefore, when the plurality of candidate categories are respectively compared with the input speech pattern by phonemic and acoustic feature data and when the category accepting the time series of the phonemic and acoustic feature data of an input speech is extracted, speech recognition can be performed with high precision, as compared with speech recognition in which only pattern matching using frequency spectrum data is performed.

Figure 2:
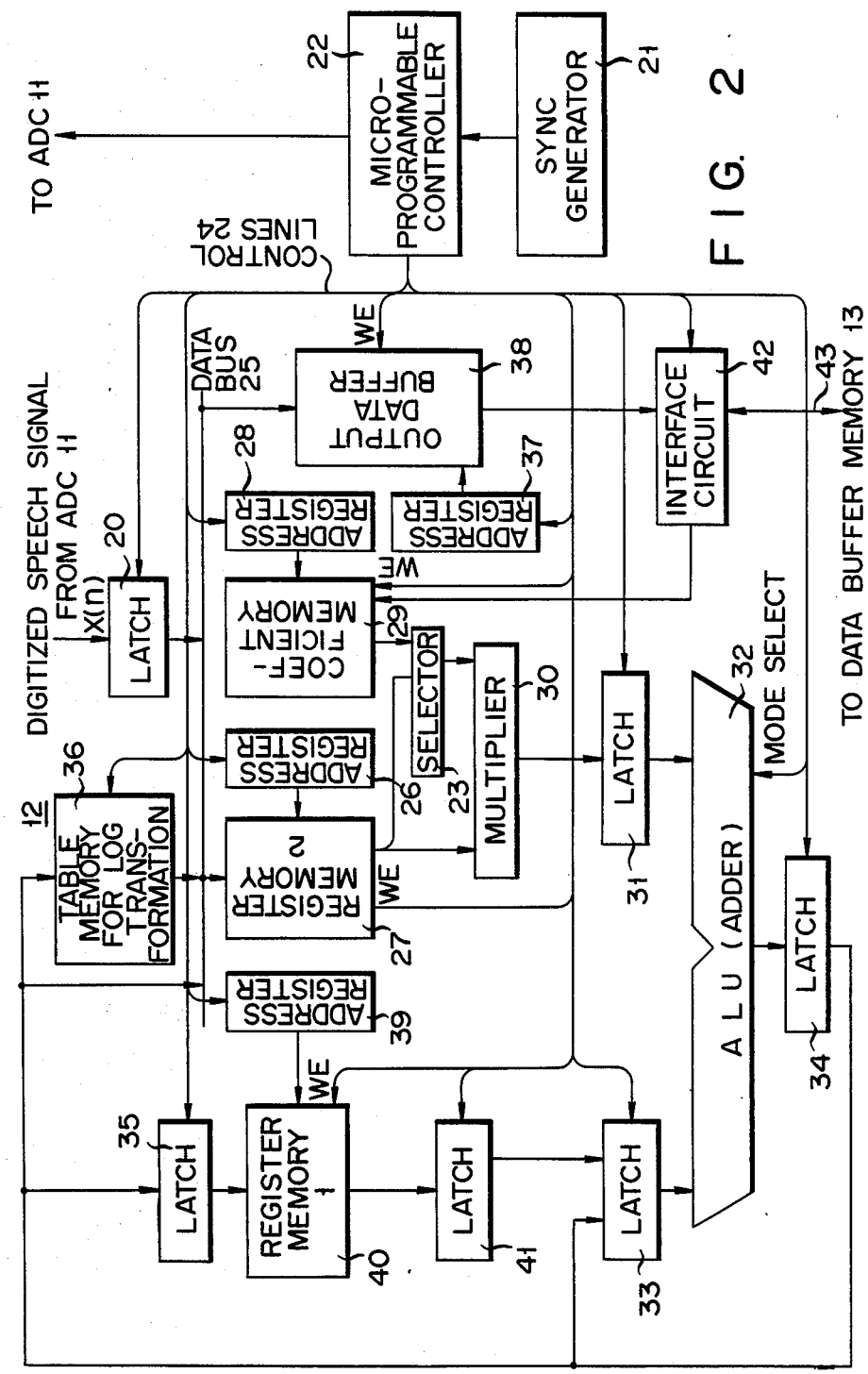
FIG. 2 is a block diagram showing the detailed configuration of an acoustic signal processing circuit shown in FIG. 1.

The arrangement and operation of the acoustic signal processing circuit 12 will be described in detail with reference to FIG. 2. A digital speech signal or data x(n) (e.g., of 12 bits) from the A/D converter 11 is latched in a latch 20. The overall configuration of the circuit shown in FIG. 2 is controlled by a micro-programmable controller 22 driven by a sync generator 21. It is noted that the A/D converter 11 shown in FIG. 1 is also controlled by the micro-programmable controller 22. The latch 20 latches the digital speech signal at every a predetermined period (e.g., 125 μsec) in response to a control signal from the controller 22 through a control line 24. The digital speech signal latched by the latch 20 is processed by a digital band-pass filter to be described later for 125 μsec so as to obtain its frequency spectra. The frequency spectra can be obtained such that a frequency band in a range between 250 Hz to 3600 Hz is divided into 16 channels, and that a frequency component included in the input speech signal is extracted for each channel by a 4th order infinite impulse response type digital filter. The frequency spectra can be simultaneously obtained using 16 band-pass filters respectively corresponding to 16 channels. However, in this embodiment, the above processing is performed by time sharing basis in place of parallel processing as will be described later.

The speech recognition system according to the embodiment of the present invention will be described. The speech recognition results in terms of obtained values vary in accordance with the type of input speech signals. The acoustic signal processing circuit 12 converts a speech signal in a frequency range between 250 Hz and 3600 Hz to 16-channel and 4-channel spectrum data. The acoustic signal processing circuit 12 also computes similarity measures for the vowel and nasal sounds. Computation results are averaged for every 10 msec, and an averaged output is produced by the acoustic signal processing circuit 12. The 10 msec computation interval is called a frame; the output from the acoustic signal processing circuit 12 is obtained for every frame.

The computations performed by the acoustic signal processing circuit 12 during one frame are summarized in items (1) to (8) below:

(1) Data Input
$X_{(n)}$ (nth input speech signal data)

(2) Energy Computation $$\sum_n X_{(n)}^2$$

(3) Pre-Emphasis $$X'_{(n)} = X_{(n)} - \{\alpha \cdot X_{(n-1)}\}$$

for $\alpha = 0.6875$ (pre-emphasis coefficient)

(4) Band-Pass Filter $$Y_{i(n)} = A_{0i}\{U_{i(n)} - U_{i(n-2)}\}$$

$$\text{for } U_{i(n)} = X'_{(n)} + \{B_{1i} \cdot U_{i(n-1)}\} + \{B_{2i} \cdot U_{i(n-2)}\}$$

where $A_{0i}$, $B_{1i}$ and $B_{2i}$ are the coefficients of the first stage filter, and i (=1 to 20) is the channel number of the filter.

$$Z_{i(n)} \text{ (filter output)} = C_{0i}\{V_{i(n)} - V_{i(n-2)}\}$$

$$\text{for } V_{i(n)} = Y_{i(n)} + \{D_{1i} \cdot V_{i(n-1)}\} + \{D_{2i} \cdot V_{i(n-2)}\}$$

where $C_{0i}$, $D_{1i}$, and $D_{2i}$ are the coefficients of the second stage filter.

(5) Low-Pass Filter $$S_{IVi} = \sum_{n=0}^{79} Z^2_{i(n)}, S_{IIIi} = S'_{IVi} + \sum_{n=0}^{79} Z^2_{i(n)}, \text{ and}$$

$$S_{IIi} = S'_{IIIi} + \sum_{n=0}^{79} Z^2_{i(n)}$$

where $S'_{IVi}$ and $S'_{IIIi}$ are the values computed during the two latest 10 ms periods, respectively.

(6) Conversion $$F_i = \text{hexadecimal float } (S_{IIi})$$

$$S_{Pi} = \log(F_i)$$

$$E = \text{hexadecimal float} \left( \sum_{n=0}^{79} X^2_{(n)} \right)$$

(7) Phonemic Similarity $$S_{ok} = \sum_{m=0}^{M} \left( \sum_{i=0}^{N} S_{Pi \cdot \phi im(k)} \right)^2$$

for $i = 0$ to 20 (the channel number), and $m = 0$ to 4 (the plane number)

where $S_{ok}$ is the correlation with the kth category.

(8) Norm $$\text{Norm} = \sum_{i=0}^{N} (S^2_{Pi}) - \left\{ (1/N) \left( \sum_{i=0}^{N} (S_{Pi}) \right) \right\}^2$$

Figure 3:
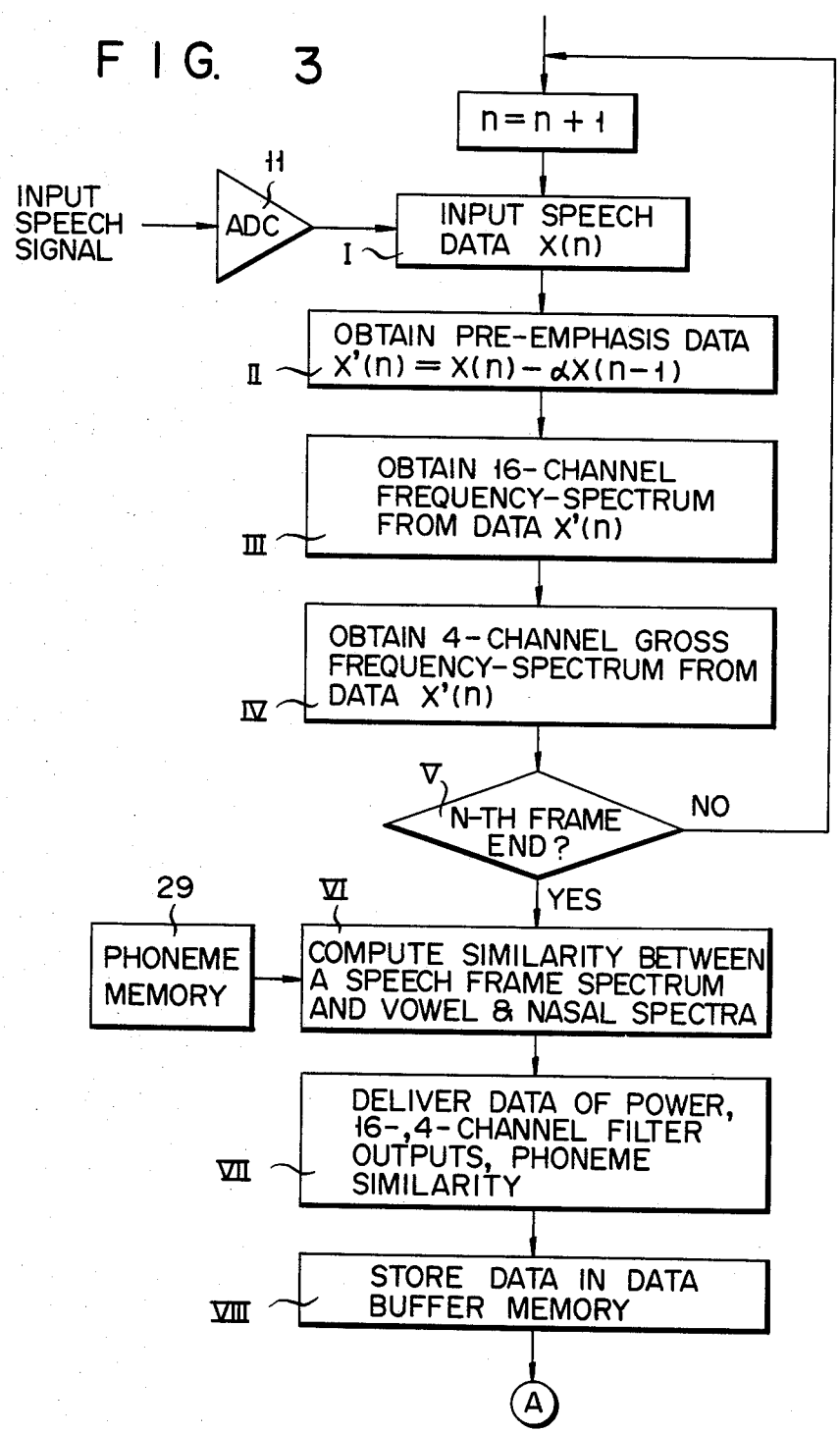
FIG. 3 is a flow chart for explaining the mode of operation of the circuit shown in FIG. 2.
Figure 4:
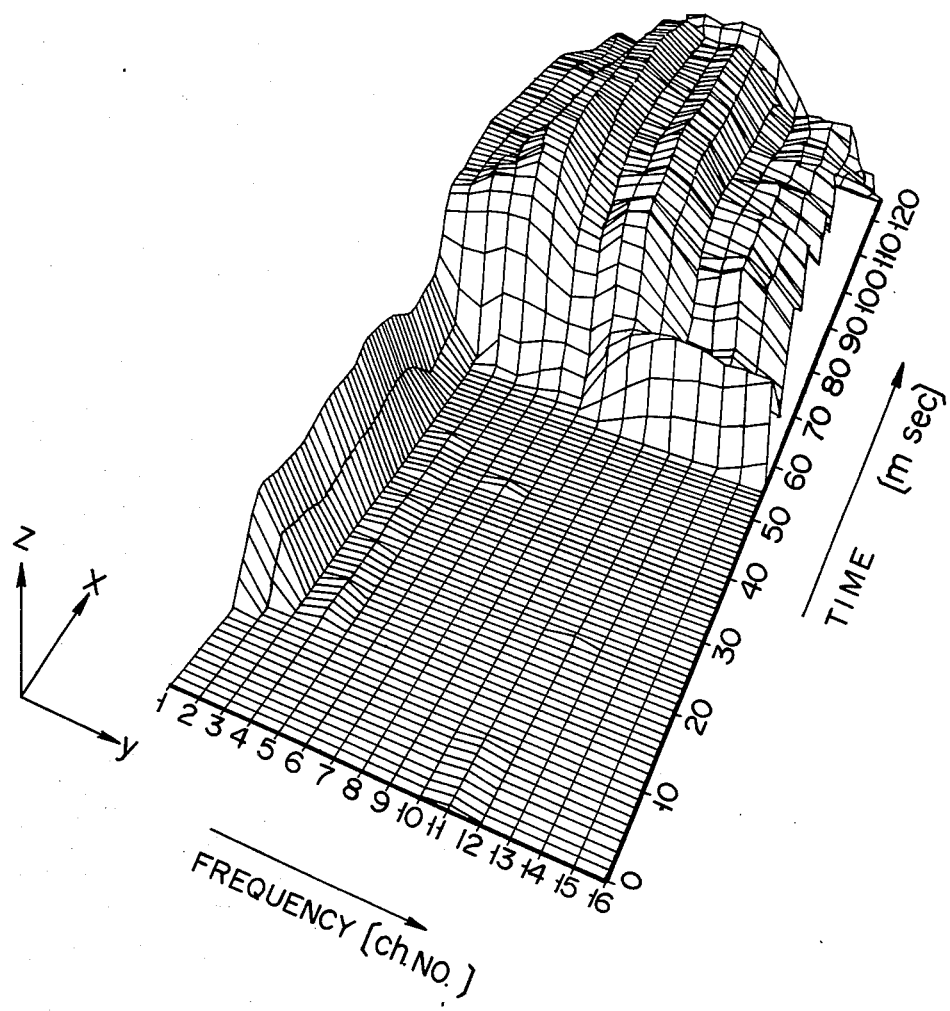
FIG. 4 is a chart schematically representing a 16-channel spectrum obtained by the circuit shown in FIG. 2.

The relationship among the circuit elements of the acoustic signal processing circuit 12 and the abovementioned computations will be described below by referring to FIGS. 2 and 3.

As may be apparent from items (1) to (8) above, the computation here is repeatedly performed by using the following equation in principle:

$$S_{(n)} = S_{(n-1)} + \{a_{(n)} \cdot b_{(n)}\} \quad (1)$$

In other words, multiplication and addition (convolution) are the basic arithmetic operations. In the circuit shown in FIG. 2, a multiplier 30 and an ALU 32 are simultaneously operated to perform the multiplication shown below:

$$a_{(n)} \cdot b_{(n)} = M_{(n)} \quad (2)$$

and the addition:

$$S_{(n-1)} + M_{(n)} \quad (3)$$

For example, if data of the multiplication result $S_{(n-1)}$ is stored in a latch 33, data $M_{(n)}$ is stored in a latch 31, the ALU 32 performs the addition in accordance with equation (3). At the same time, the multiplication operation for $M_{(n+1)}$ in accordance with equation (2) is performed, so that equation (1) can be computed at high speed. For this purpose, intermediate computation results are properly distributed to and stored in a register memory 40, a register memory 27, the latches 31 and 34, and latches 35 and 41. This distribution, selection of the operation mode, and latching timing are controlled by a micro-programmable controller 22.

According to item (1), $X_{(n)}$ is the nth digital speech signal data. In this embodiment, the data is converted and sampled by the A/D converter 11 for every 125 μsec. The converted data is then supplied to the acoustic signal processing circuit 12 as in step I. Using the nth input speech signal data $X_{(n)}$, a power computation of the input speech signal can be performed by the following equation:

$$E_{(n)} = E_{(n-1)} + X^2_{(n)} \quad (4)$$

The intermediate result $E_{(n-1)}$ is stored in the register memory 40. The computation by equation (4) can be performed for the subsequent 80 samples of the speech signal data, thus performing the power computation for one frame. In response to the input data $X_{(n)}$, preemphasized speech signal data is obtained by the following equation (step II):

$$X'_{(n)} = X_{(n)} - \alpha X_{(n-1)} \quad (5)$$

In order to compute the pre-emphasized data $X'_{(n)}$, data $X_{(n-1)}$ immediately before the nth input speech signal data $X_{(n)}$ is required as the sample. The (n−1)th and nth input speech signal data are stored together in a register memory 27.

Using the pre-emphasized data $X'_{(n)}$ obtained by equation (5), the 16-channel band-pass filter performs the spectrum computation (step III), and the 4-channel band-pass filter performs the gross spectrum computation as in step IV. These computations are performed in accordance with equations (6) as follows:

$$\left. \begin{array}{l} U_{i(n)} = X'_{(n)} + \{B_{1i} \cdot U_{i(n-1)}\} + \{B_{2i} \cdot U_{i(n-2)}\} \\ Y_{i(n)} = A_{0i}\{U_{i(n)} - U_{i(n-2)}\} \\ V_{i(n)} = Y_{i(n)} + \{D_{1i} \cdot V_{i(n-1)}\} + \{D_{2i} \cdot V_{i(n-2)}\} \\ Z_{i(n)} = C_{0i}\{V_{i(n)} - V_{i(n-2)}\} \end{array} \right\} \quad (6)$$

for i = 1 to 20 (channels i (=1 to 16) correspond to the spectrum obtained by the 16-channel band-pass filter, and channels i (=17 to 20) correspond to the gross spectrum obtained by the 4-channel band-pass filter.) where $A_{0i}$, $B_{1i}$, $B_{2i}$, $C_{0i}$, $D_{1i}$ and $D_{2i}$ are the coefficient data for computing the output from the ith channel of the band-pass filter. These coefficient data are stored in a coefficient memory 29. The intermediate results $U_{i(n)}$, $U_{i(n-1)}$, $U_{i(n-2)}$, $V_{i(n)}$, $V_{i(n-1)}$, $V_{i(n-2)}$ and $Z_{i(n)}$ are stored in the register memory 27. Data $X'_{(n)}$ and $Y_{i(n)}$ are stored in the register memory 40.

The data $Z_{i(n)}$ obtained by one of equations (6) is the output from the ith channel of the band-pass filter and is further filtered by a low-pass filter so as to compute the spectrum for every frame in accordance with the following equation:

$$S_{i(n)} = S_{i(n-1)} + Z^2_{i(n)} \quad (7)$$

for i = 1 to 20

The computation results of the 80 samples are obtained by equation (7). The data $S_{i(n)}$ are then added to the result of the two latest 10 ms periods (i.e., two latest frames) as follows, thus completing low-pass filtration:

$$\left.\begin{array}{l}S_{IVi} = S_{i(n)} \\ S_{IIIi} = S'_{IVi} + S_{IVi} \\ S_{IIi} = S'_{IIIi} + S_{IVi}\end{array}\right\} \quad (8)$$

where $S'_{IIIi}$ and $S'_{IVi}$ are respectively the computation results of $S_{IIIi}$ and $S_{IVi}$ of the immediately preceding frame. The data $S_{IVi}$ is stored in the register memory 40, while the data $S_{IIIi}$ and $S_{IIi}$ are stored in the register memory 27. It is noted that data $S'_{IIIi}$ and $S'_{IVi}$ are not necessary when the computations by equations (8) are completed, so the data $S'_{IIIi}$ and $S'_{IVi}$ are updated. The data $S_{IIi}$ obtained by equations (8) corresponds to the final filter output.

In the energy computed by equation (4), the low-pass filtration is also performed in the same manner as in equations (8). The spectrum data computed by equations (8) is logarithm-transformed by a logarithm-transforming circuit 36 via $F_i$ in the item (6) of the summary of computations, thus obtaining the final spectrum data as follows:

$$S_{Pi} = \log(S_{IIi}) \text{ for } i = 1, 2, \ldots, 20 \quad (9)$$

In the step VI, the phoneme similarity measures for the vowel and nasal sounds are computed as follows:

$$\Sigma'_{jm(k)} = \Sigma'_{j-1,m(k)} + S_{Pj} \cdot \phi_{jm(k)}$$

for $j = 1$ to 16

$$\Sigma_{m(k)} = \Sigma_{m-1(k)} + (\Sigma'_{16m(k)})^2 \quad (10)$$

for $m = 1$ to 5 and $k = 1$ to 32 (the number of phoneme categories)

Norm data N of the spectrum data is computed as follows:

$$\left.\begin{array}{l}N'_j = N'_{j-1} + (S_{Pj})^2 \\ d_j = d_{j-1} + S_{Pj} \\ \text{for } j = 1 \text{ to } 16 \\ N = N'_{16} - (1/16) d_{16}\end{array}\right\} \quad (11)$$

Data $\phi jm(k)$ for $j = 1$ to 16, $m = 1$ to 5, and $k = 1$ to 32 is constituted by five 16-dimensional vector data for one phoneme of the phoneme dictionary pattern corresponding to the kth phoneme category. The data $\phi jm(k)$ is stored in the coefficient memory 29.

In the step VII, the energy data E, the logarithm energy data log(E), the spectrum data $S_{pi}$ ($i = 1$ to 20), the phoneme similarity data $\Sigma 5(k)$ ($k = 1$ to 32), and the norm data N are stored in an output data buffer 38, finally. These data are then read out and transmitted onto a data bus 43 through an interface circuit 42 for every 10 msec.

Figure 5:
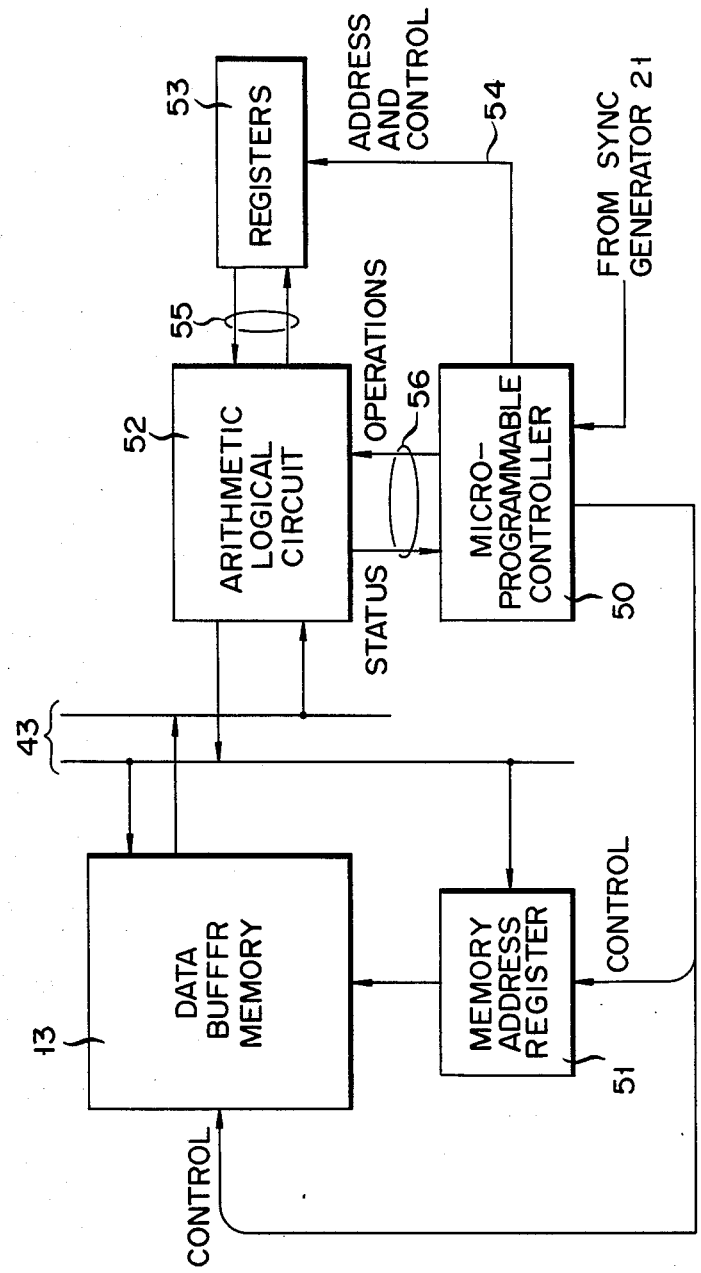
FIG. 5 is a block diagram showing a control circuit and a subsidiary feature recognition section which are shown in FIG. 1.

In step VIII, the data transmitted onto the data bus 43 are sequentially stored in the data buffer memory 13 shown in FIG. 5. The data buffer memory 13 is addressed by a memory address register 51 which is controlled by a micro-programmable controller 50. The controller 50 also controls an arithmetic logical circuit (ALC) 52 and a register unit 53 which receives an address signal and a control signal through a data bus 54. The ALC 52 exchanges data with the register unit 53 through a data bus 55. The controller 50 exchanges status data and operation data with the ALC 52 through a control bus 56.

Figure 6:
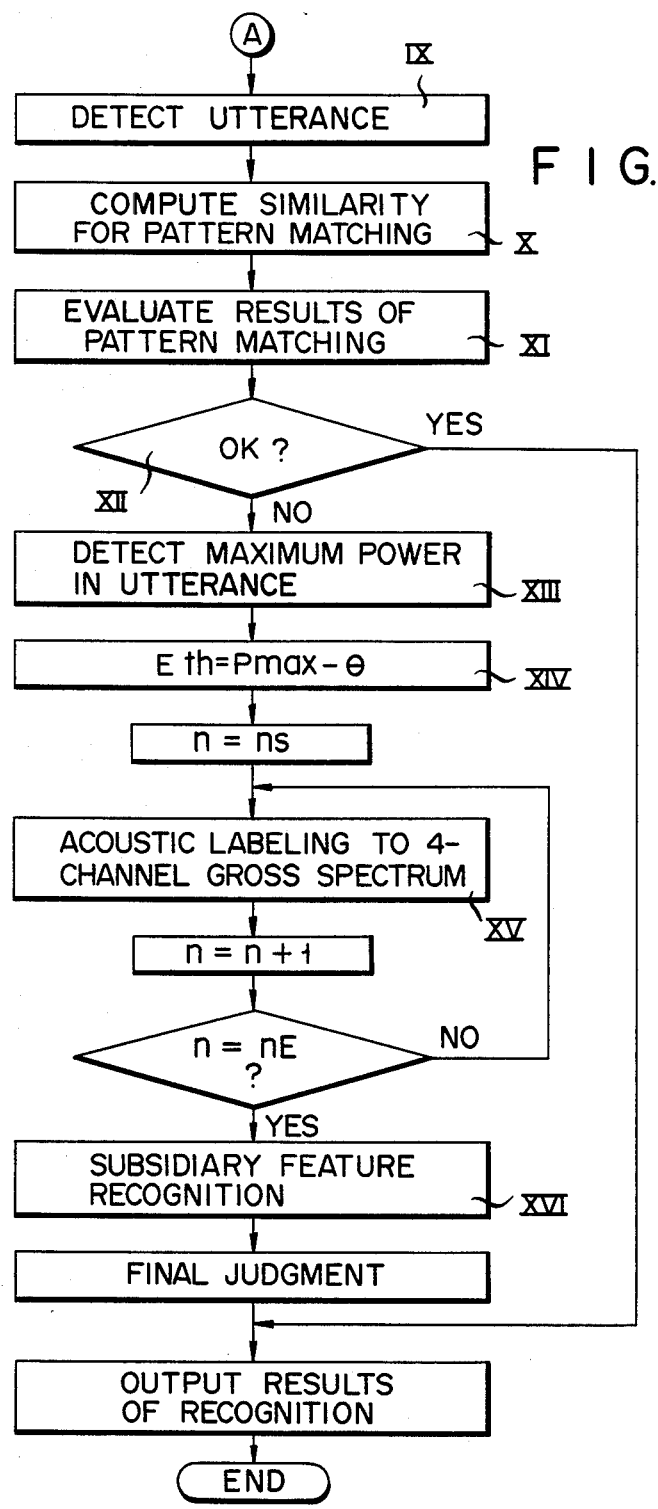
FIG. 6 is a flow chart for explaining the mode of operation of the circuits shown in FIGS. 5 and 7.

In the circuit shown in FIG. 5, the speech signal is detected from data continuously stored in the data buffer memory 13 in step IX of the flow chart of FIG. 6. In other words, the signals supplied from the microphone to the A/D converter 11 shown in FIG. 1 include various types of noise as well as speech signals to be recognized. Therefore, the data buffer memory 13 must store only speech signal data before similarity computation is started. For this purpose, a method for detecting speech intervals which is disclosed in U.S. patent application Ser. No. 412,234 may be used. It is apparent that the circuit arrangement described in U.S. Pat. No. 412,234 substantially corresponds to the controller 50, the ALC 52 and the register unit 53 of FIG. 5, and a detailed description thereof will be omitted.

Figure 7:
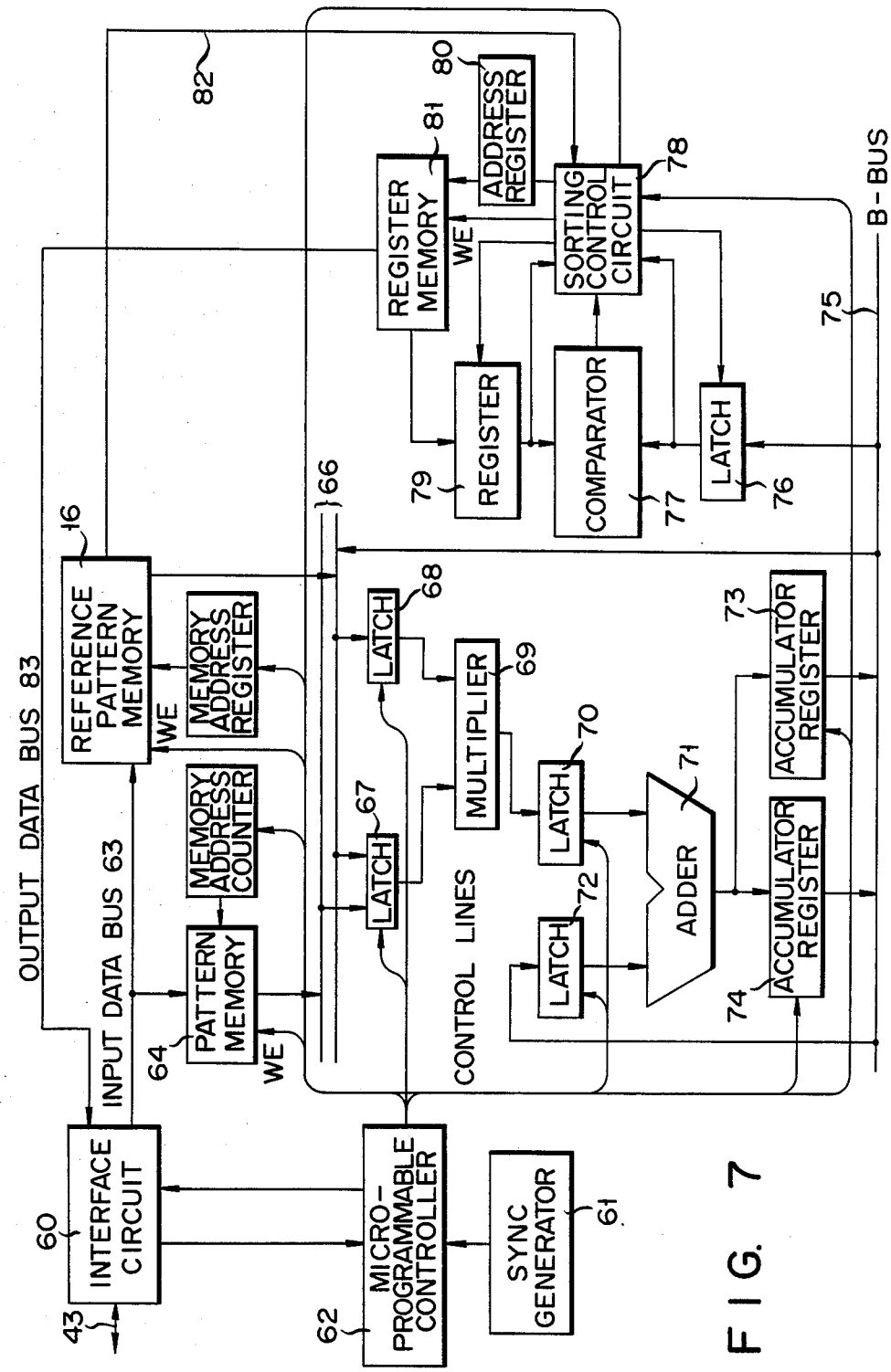
FIG. 7 is a block diagram showing the detailed configuration of a similarity computation circuit shown in FIG. 1.

When all necessary data which correspond to the detected speech intervals are stored in the data buffer memory 13, step X is executed in which similarity computation by the circuit shown in FIG. 7 is started. The data stored in the data buffer memory 13 of FIG. 5 is supplied to an interface circuit 60 of FIG. 7 through the data bus 43. The following computations are performed by the similarity computation circuit 15 shown in FIG. 7:

$$\left.\begin{array}{l}S'(k) = \sum_{j=1}^{J} \lambda_j(k) \cdot \left(\sum_{i=1}^{256} X_i \cdot \phi_{ij(k)}\right)^2 \\ N = \sum_{i=1}^{256} X_i^2 - \left\{(1/256) \sum_{i=1}^{256} X_i\right\}\end{array}\right\} \quad (12)$$

the data $X_i$ ($i = 1$ to 256) is the vector component which constitutes the speech pattern to be recognized by pattern matching and is stored in a pattern memory 64 through an interface circuit 60 via the data bus 43. The data $\phi_{ij(k)}$ ($i = 1$ to 256, $j = 1$ to J and $k = 1$ to K) corresponds to a set of vectors which constitutes the standard speech pattern of the kth category, where one category is constituted by J 256-dimensional vectors. And, the data $\lambda_j(k)$ ($j = 1$ to J) is a set of eigenvalues which corresponds to a set of vectors $\phi_j(k)$ ($j = 1$ to J, $k = 1$ to K). The data N corresponds to the norm of the vector $X_i$.

As may be apparent from equations (12), all the arithmetic operations required here are multiplication and addition operations. Equations (12) can be rearranged in the form of equation (1). In other words, for data $S'_{(k)}$:

$$S''_{ji(k)} = S''_{j(i-1)(k)} + X_i \cdot \phi_{ij(k)} \quad (13)\text{-}1$$

for $i = 1$ to 256 and $S''_{j0(k)} = 0$ $$S'_{j(k)} = S'_{j-1(k)} + \lambda_j(k) \cdot (S''_{j256(k)})^2 \quad (13)\text{-}2$$

for $j = 1$ to J and $S'_{0(k)} = 0$ $$S'_{(k)} = S'_{J(k)} \quad (13)\text{-}3$$

According to equation (13)-1, the data $X_i$ is sequentially read out from the pattern memory 64, and at the same time, the data $\phi_{ij(k)}$ is read out from the reference pattern memory 16. For the simplicity of computation, the vectors $\phi_{ij(k)}$ are converted by multiplying $\sqrt{\lambda_{j(k)}}$ to each of them. Furthermore, a multiplication operation $\{X_i \cdot \phi_{ij(k)}\}$ is performed by the multiplier 69. The obtained multiplication data is added by the adder 71 to data $S''_{i-1(k)}$ which are accumulated so far and which are stored in the accumulator register 74. Similarly, according to equation (13)-2, the data $S''_{j256(k)}$ stored in the accumulator register 74 is squared by the multiplier 69 to obtain data $\{S''_{j256(k)}\}^2$. This squared or power data is added by the adder 71 to the correlation result $S'_{j-1(k)}$ which is obtained so far for the same category and which is stored in the accumulator register 73. The norm data N is obtained in the following manner:

$$N_{2(i)} = N_{2(i-1)} + X_i^2$$

for i=1 to 256 and $N_{2(0)}=0$ $$N_{1(i)} = N_{1(i-1)} + X_i$$

for i=1 to 256 and $N_{1(0)}=0$ $$N = N_{2(256)} - \{(1/256) \cdot N_{1(256)}\}$$

The above equations can be computed in the same manner as equations (13)-1 to (13)-3.

The similarity computation for the input speech signal pattern data $\{X_i\}$ is performed for all the category data stored in the reference pattern memory 16. The factors finally required at the end of the similarity computation are categories k1, k2, ..., and km for the largest to the mth largest similarity measures and correlation data $S'_{(k1)}, S'_{(k2)}, \ldots,$ and $S'_{(km)}$ corresponding thereto. For this reason, a sorting logic or sorting control circuit 78 is arranged in the similarity computation circuit 15. The sorting control circuit 78 compares the previously obtained correlation data and each data obtained by equations (13)-1 to (13)-3. A register memory 81 then stores the correlation measure data in their descending order together with the category number data corresponding thereto. When the updated $S'_{(K)}$ is latched by a latch 76, the previously computed data are read out from the register memory 81 from the largest value to the smallest value under the control of the sorting control circuit 78. The readout data are then set in a register 79 and are compared by a comparator 77 with the storage contents of the latch 76. When the contents of the register 79 are smaller than those of the latch 76, the control circuit 78 erases the mth data of the register memory 81 so as to assure the memory area for storing the data of the latch 76. Thereafter, the data from the latch 76 is stored in the corresponding data area of the register memory 81, thus completing the sorting operation.

When a series of similarity computations is completed according to the procedure as described above, the computation results are supplied onto the data bus 43 through the interface circuit in the order of $\{S'_{(k1)}, k1\}$, $\{S'_{(k2)}, k2\}, \ldots, \{S'_{(km)}, kn\}$, and N. In the embodiment 5 is selected as to number of m. The five pairs of similarity measure data and the category data are supplied to the data buffer memory 13 and are stored therein.

The complete computations of equation (14) are performed for the five pairs to obtain five accurate similarity measures S(k):

$$S(k) = \frac{S'(k)}{\lambda_{1(k)} N}, \quad k = k1, \ldots, k5 \quad (14)$$

These computations are simple subtractions and divisions and can be easily performed by the ALC 52 and the register unit 53 under the control of the micro-programmable controller 50. The five pairs of data which have the largest values of similarity are stored in the data buffer memory 13.

In step XI, the largest similarity measure S(k1) among the five similarity measures is compared by the ALC 52 with a predetermined threshold value T1 the data of which is stored in the register unit 53. Furthermore, a difference between the largest similarity measure S(k1) and the second largest similarity measure S(k2) is also obtained. The difference is then compared with a predetermined threshold value T2 the data of which is also stored in the register unit 53. When inequalities (15) and (16) below are both satisfied in step XII, the controller 50 determines that the category data stored in association with the largest similarity measure S1 in the data buffer memory 13 corresponds to the input speech:

$$S(k) > T1 \quad (15)$$

$$S(k1) - S(k2) > T2 \quad (16)$$

The corresponding category data is then supplied onto the data bus 43.

However, when the condition given by inequality (15) is not satisfied, subsidiary feature recognition operation by the circuit shown in FIG. 5 is performed for the input speech spectrum data stored in the data buffer memory 13, using the acoustic feature and phoneme parameter data.

Figure 8A:
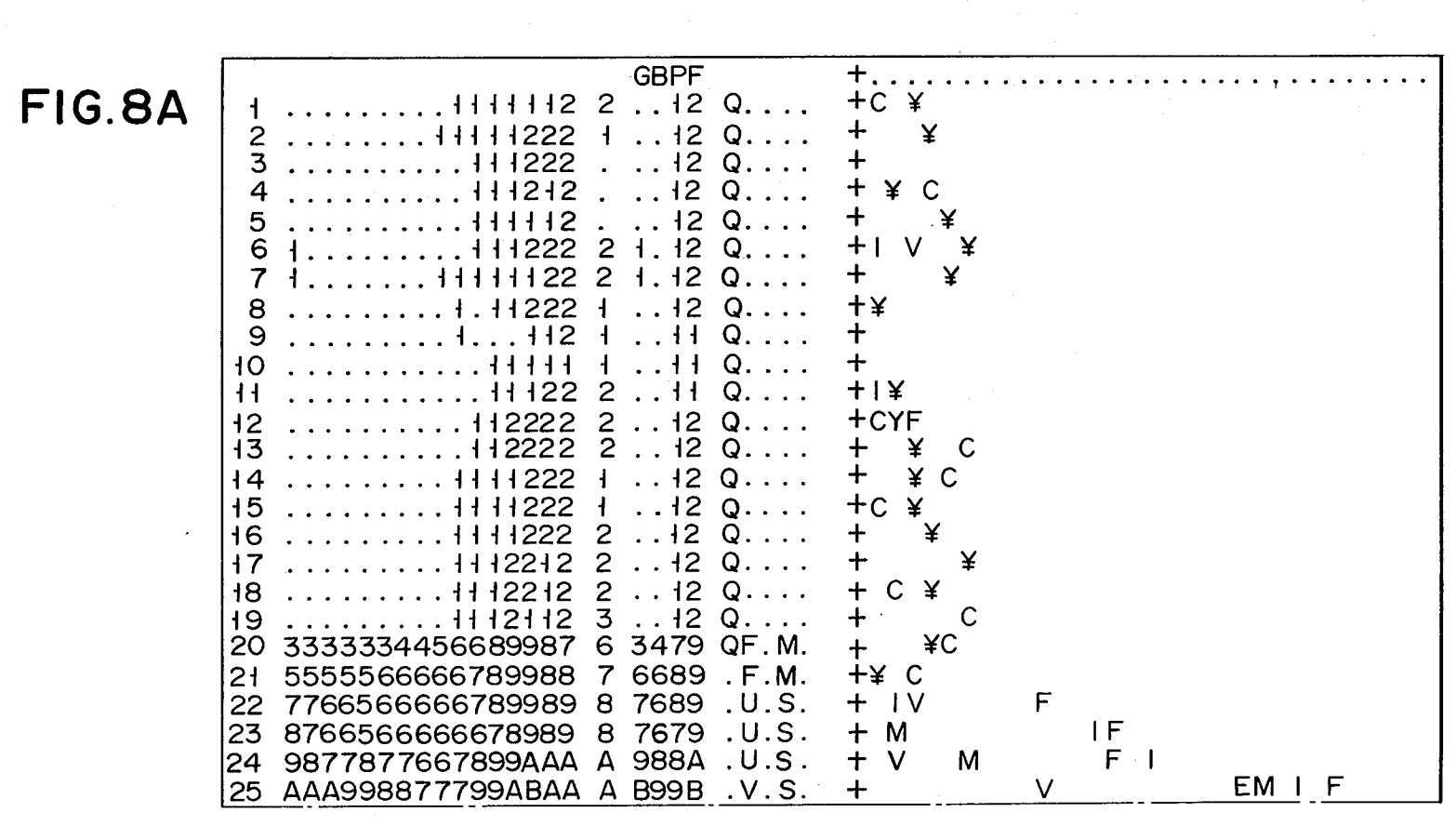
Figure 8B:
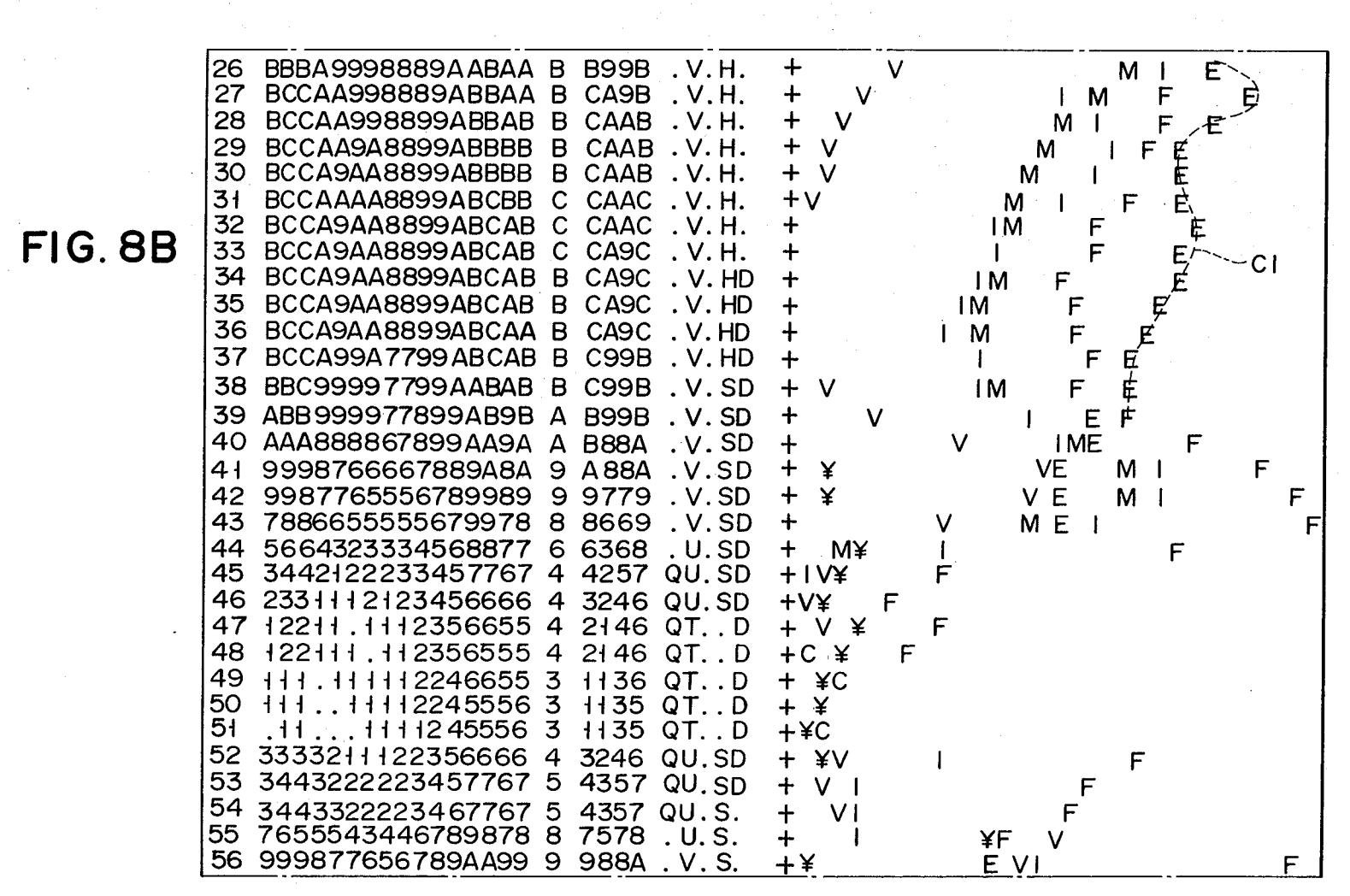
Figure 8C:
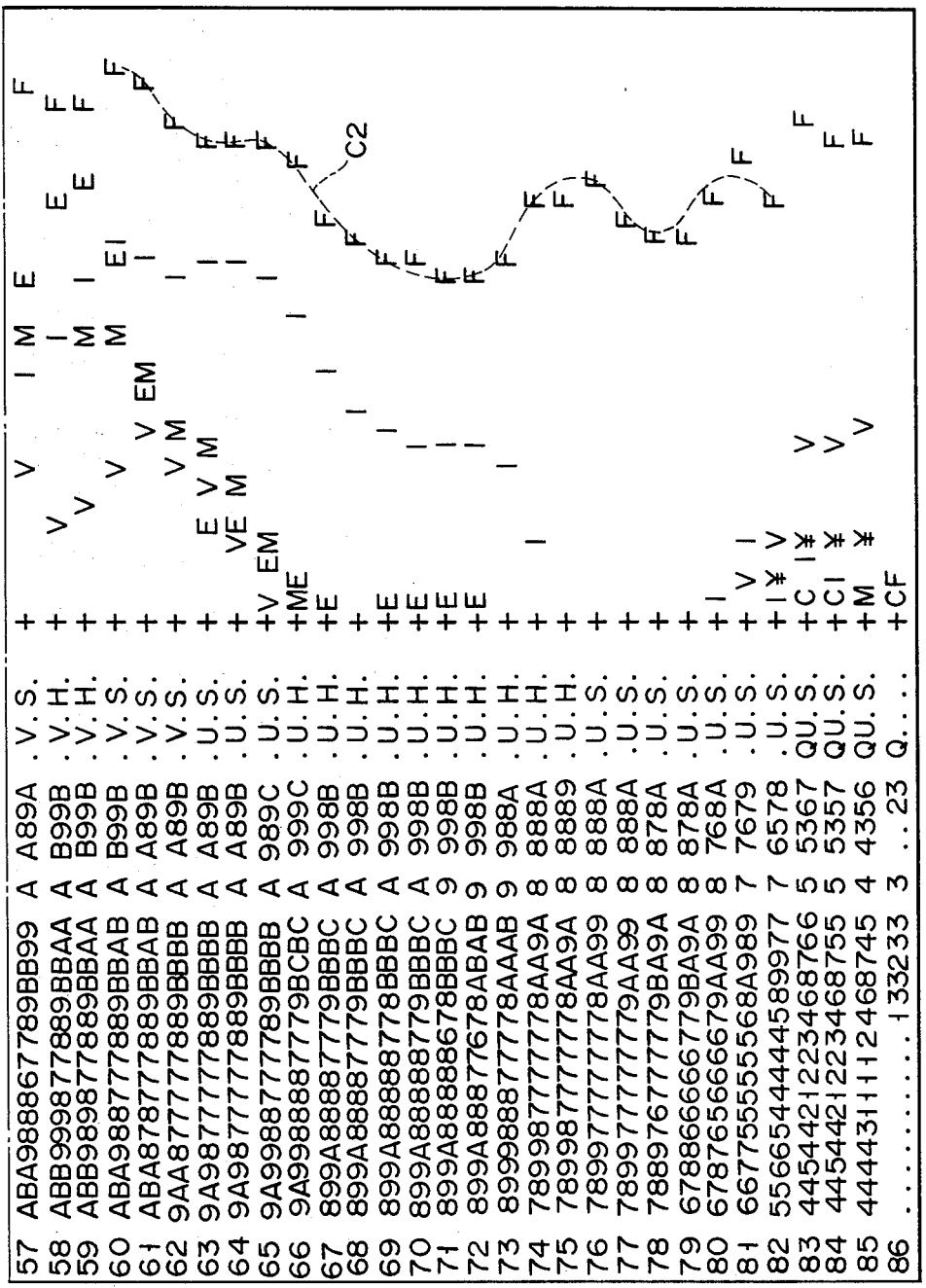

FIG. 8 is a printed code table of the 16-channel spectrum data, the power data, the 4-channel gross spectrum data, the acoustic parameter data and the similarity data of vowel and nasal sounds. Referring to FIG. 8, reference numerals 1 to 86 in the left-hand side denote frame numbers of the speech data. Sixteen-digit alphanumeric characters are the 16-channel spectrum data. A dot indicates that the power is zero. Numbers 1 to 9 and letters A, B and C indicate that the power is increased in the order named, so that C is the maximum power in this case. The next digit number or one of letters A, B and C indicates the log average power of the input speech data in each frame. The next four digits indicate the 4-channel gross spectrum data. The next five digits indicate an acoustic label assigned to each 4-channel gross spectrum data to be described later. The rightmost 35 digits indicate a similarity measure for the vowel or nasal sound. This similarity measure is designated by a symbol. When the similarity measure is increased, the symbol moves to a digit to the right. Therefore, envelopes C1 and C2 are founded to be the speech patterns having the largest similarity measures for the vowel. As may be apparent from FIG. 8, the utterance or speech interval starts at the 20th frame terminates at the 85th frame. It is noted that the word to be recognized is Japanese word "TEISEI" which means correction. FIG. 8 is the actually measured data for word "TEISEI".

In step XIII, a maximum value Pmax of the speech power within the speech interval from the 20th to 85th frames shown in FIG. 8 is detected by the controller 50 shown in FIG. 5. Subsequently, in step XIV, a predetermined value $\theta$ is read out from the register 53 to subtract the predetermined value $\theta$ from the maximum value Pmax of the power, so that a power threshold value Eth (=Pmax$-\theta$) is obtained. In step XV, when an input speech power log$\{E(n)\}$ is smaller than the threshold value Eth, the input speech signal is regarded to be soundless. An acoustic label Q is attached to the input speech signal. Such labeling is performed for 4- channel gross spectrum data G1(n), G2(n), G3(n) and G4(n) read out from the data buffer memory 13. FIG. 9 shows the change in level of the 4-channel gross data relative to the label of the acoustic parameter. More specifically, the 4-channel gross spectrum data G1(n) to G4(n) read out from the data buffer memory 13 by means of the controller 50 in each frame are compared with each other and a label of the acoustic feature are sequentially stored in the memory 13 for every frame. In this manner, the labels shown in FIG. 9 are attached to the respective frames.

Subsidiary feature recognition will be described in detail with reference to FIGS. 8, 9 and 10. The phoneme feature and the acoustic parameter are used as the subsidiary features Vowels "a", "e", "i", "o" and "u" and nasal sounds are used as the phoneme features. The phoneme similarity curves C1 shown in the rightmost position in FIG. 8 are phonemes of the largest similarities in the frames 26 to 39 and indicates the vowel "e". The curve C2 also indicates the vowel "e".

Figure 10:
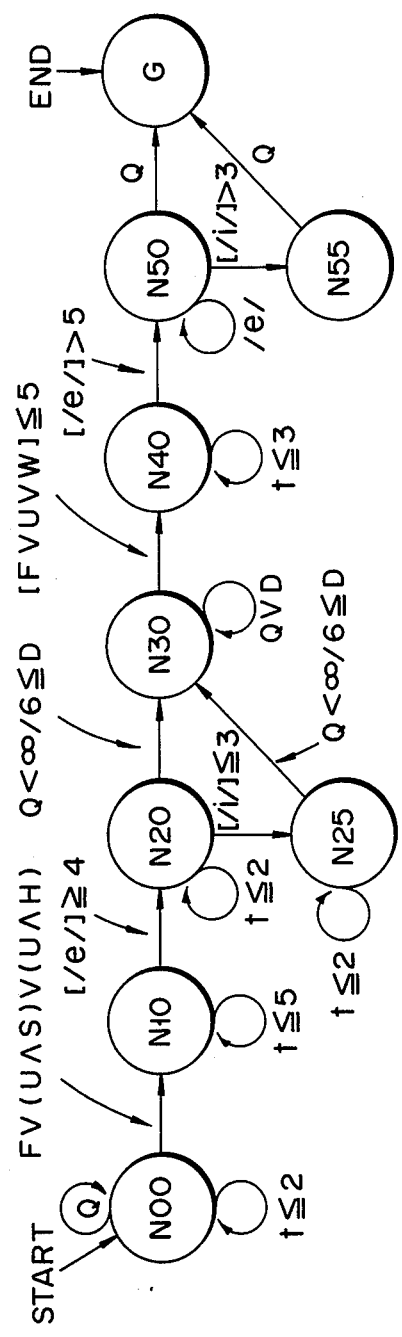
FIG. 10 is a chart showing an example of a transition recognition network used in subsidiary feature recognition.

FIG. 10 shows a recognition network used for subsidiary feature recognition. This network is a program chart to be actually performed by the controller 50 shown in FIG. 5 and shows a case in which a Japanese word "TEISEI" is a word to be recognized. The network has nine nodes from node N00 to the node G. The input pattern is read in the start node N00 from the beginning to the end. The status of the node is changed in accordance with the input pattern. The transient conditions are indicated together with the arrows between two adjacent nodes to transmit data from one node to another. In subsidiary recognition, data of the phoneme features such as the five vowels ("a", "e", "i", "o" and "u") and the nasal sounds (i.e., "m", "n" and "η", and the 12 acoustic feature labels shown in FIG. 9 are sequentially entered in the transient network. If the label of each frame of the input speech signal satisfies a corresponding transient condition, the data is transmitted to the next node. However, if the label does not satisfy a corresponding transient condition, the word data is eliminated from the candidate categories. The candidate word which reaches the end node G is regarded as the recognition result which is then produced therefrom.

Referring to FIG. 10, during when no sound is detected the program stays at the node N00. Moreover, when a sound is detected but the obtained label is not one which can transmit the program to next node N10, the node stays at N00, in case the same label continuing for not more than two frames ($t<2$). When $t>2$ stands the input word is rejected (where t is a label for don't care). When t is equal to or smaller than 2, that is, when the input speech sound state is changed from the silent state, and when an unvoiced fricative sound F, (U ∧ S) or (U ∧ H) (where ∧ indicates the logical AND, and ∨ indicates the logical OR) is detected, the program is transferred to the next node N10. If a first vowel "e" is detected within five frames the node stays at N10. When the vowel "e" is continuously detected for more than four frames, the program is transferred to the next node N20. Thereafter, when the vowel "i" is continuously detected for more than three frames, the program is transferred to the next node N25. When another labels other than above are detected for not more than two frames, the node stays at N20.

When a silent frame is detected or label of power dip is detected for more than 6 frames, in the node N20 or N25, the procedure is transferred to the node N30 ($Q<\infty/6\leq D$). When the label Q or D is detected in the node N30, the program is stopped in the node N30. When the label F, U or W is detected within less than 4 frames in the node N30, the program is transferred to the next node N40. When the vowel "e" is continuously detected for more than five frames in the node N40, the program is then transferred to the node N50. When the vowel "i" is continuously detected for more than three frames in the node N50, the program is transferred to the next node N55. When a label Q is detected in the nodes N50 or N55, the program is transferred to terminal node G. It is noted that the recognition program can be transferred from the node N20 to the node N30 after the vowel "e" is continuously detected for more than 4 frames irrespective of detection of the subsequent vowel "i", provided that the conditions with respect to the labels Q and D are satisfied. This means that the speech recognition system of this invention has an extra possibility of word recognition even if a word pronouncing manner is changed. The same operation is performed in the node N50. When only one candidate word reaches the end node G of the network, it is regarded as the recognition result. However, when more than two candidate words reach the end node G, the category data having the largest similarity measure S(n) is produced as the recognized word. When no word reaches the end node G, the controller 50 rejects the input speech signal.

According to the speech recognition system of the present invention, the input speech signal is recognized to obtain a similarity measure by comparing its speech pattern and the reference speech pattern. When distinct recognition cannot be made by respectively comparing the reference speech patterns and the corresponding input speech patterns, subsidiary recognition procedure is performed using the phoneme feature and the acoustic feature of the input speech signal. As a result, very stable speech recognition can be performed with high precision. In the system of the present invention, pattern matching which is flexible for changes in time and level of the input speech signal is used to perform main speech recognition. Furthermore, undefined words, noises and the similar speech patterns which cannot be recognized by pattern matching can be recognized or rejected by subsidiary feature recognition. Therefore, accurate speech recognition can be performed for many and unspecified speakers. Furthermore, erroneous recognition caused by noise or the like can be prevented, thus providing many practical advantages.

Various similarity computation methods of the speech patterns can be used except for the method using the 16-channel frequency spectrum data in the above embodiment. For example, if a mixed similarity method described in the U.S. Pat. No. 3,906,446 is used, main speech recognition can be precisely performed.

What we claim is:

1. A speech recognition system comprising:
   means for converting audible input speech into an input sheech signal;
   acoustic signal processing means for extracting first feature data, second feature data and third feature data from the input speech signal, the first feature data being a time-frequency spectrum pattern data comprising a plurality of frame data arranged on a time axis, and each of the frame data being frequency spectrum data obtained at each of predetermined time points on the time axis, the second feature data being phoneme data obtained in respective frames defining respecitve computation intervals, the frequency range of the input speech signal being divided into a plurality of channels and the frequency spectrum data being obtained at each channel, the phoneme data of each frame being labelled with a prescribed character, and the third feature data being a coded acoustic feature data, the frequency spectrum data of each frame being divided into gross spectrum envelopes;

a buffer memory means for storing the first to third feature data;

a reference pattern memory means for storing first, second and third reference data each a similarity computation circuit for computing similarities between the first to third feature data and the first to third reference data, respectively;

means for determining a word class pattern having a first reference pattern which gives a largest similarity as being the input speech signal when the largest similarity is larger than a prescribed value and when a difference between the largest sililarity and a second largest similarity is larger than a prescribed value;

means for extracting m classes of patterns of reference patterns which give the largest to mth largest similarities when the word class pattern is regarded not to correspond to the input speech signal;

means for computing similarities between the second feature data and the second reference data and between the third feature data and the third reference data for determining whether or not one of said m classes of patterns correspond to the input speech signal.

2. A system according to claim 1, wherein said acoustic signal processing means comprises time-frequency spectrum data obtaining means including a digital band-pass filter which performs a time sharing operation.

3. A system according to claim 1, wherein said acoustic signal processing means comprises a second digital filter comprising a coefficient memory for prestoring coefficient data to set filter characteristics corresponding to the second and third features, and a micro-programmable controller for controlling operation of said second digital filter.

4. A system according to claim 1, wherein said similarity computation circuit includes:

a micro-programmable controller for reading out the first to third feature data stored in said buffer memory means and the first to third reference data stored in said reference pattern memory means;

a multiplier for multiplying the first to third frame data and the first to third reference data;

operation circuits for sequentially accumulating outputs from said multiplier; and a register for storing as similarity measure data an output from said operation circuits.

5. A system according to claim 4, wherein said similarity computation circuit further has sorting means for arranging m similarity measure data stored in said register in accordance with magnitudes thereof.

6. A system according to claim 1, wherein said acoustic signal processing means has phoneme feature data extracting means for extracting phoneme feature data such as vowel and nasal sounds from the input speech signal, and said means for computing similarities has acoustic feature data extracting means for extracting acoustic feature data from the frequency spectrum data of said second feature data and performs speech recognition using as the second feature parameter data the phoneme feature data and the acoustic feature data.

7. A system according to claim 1, wherein said comparing means has a register for storing first and second threshold values, and a controller for determining that the class of pattern of the reference speech pattern which gives the largest similarity measure corresponds to a finally recognized speech when the largest similarity measure exceeds the first threshold value and the difference between the largest similarity measure and the second largest similarity measure exceeds the second threshold value.

8. A method for recognizing speech comprising the steps of:

extracting input speech pattern data which consists of time series of first feature parameter data of an input speech from an input speech signal;

storing the input speech pattern data;

storing a plurality of reference speech pattern data;

computing a similarity measure between the input speech pattern data and said plurality of reference speech pattern data;

determining whether or not a category having a reference pattern which gives a largest similarity measure corresponds to the input speech in accordance with a difference between the largest similarity measure and a second largest similarity measure;

extracting m categories of said plurality of reference patterns which give the largest to mth largest similarity measures when the category is regarded not to correspond to the input speech;

comparing the m categories with the input speech by using second feature parameter data; and storing the second feature parameter data, whereby the category of the reference pattern corresponding to the input speech is determined by comparison results.

* * * * *